United States Patent
Schwuger et al.

[19]

[11] Patent Number: 6,016,895
[45] Date of Patent: Jan. 25, 2000

[54] SYNCHRONIZING DEVICE

[75] Inventors: Josef Schwuger, Höchstadt/Aisch; Rudolf Sinner, Bubenreuth; Hartwig Waldert, Aisch, all of Germany

[73] Assignee: INA Wälzlager Schaeffler oHG, Herzogenaurach, Germany

[21] Appl. No.: 09/067,518

[22] Filed: Apr. 28, 1998

[30] Foreign Application Priority Data

Apr. 30, 1997 [DE] Germany ................ 197 18 317

[51] Int. Cl.[7] .................................................... F16H 3/38
[52] U.S. Cl. .................... 192/53.34; 74/339; 192/219; 192/66.2
[58] Field of Search ................ 192/66.2, 63.34, 192/53.3, 53.331, 53.33, 219; 74/339

[56] References Cited

U.S. PATENT DOCUMENTS

| | | | |
|---|---|---|---|
| 4,687,081 | 8/1987 | Osterloff et al. ............ | 192/53.32 |
| 4,732,247 | 3/1988 | Frost . | |
| 5,337,872 | 8/1994 | Kawamura et al. ............ | 192/107 M |
| 5,343,993 | 9/1994 | Soffa ........................... | 192/53.34 |
| 5,651,435 | 7/1997 | Perosky et al. ............... | 192/215 |
| 5,803,218 | 9/1998 | Perosky et al. ............... | 192/215 |
| 5,887,688 | 3/1999 | Ploetz et al. .................. | 192/53.341 |

FOREIGN PATENT DOCUMENTS

| | | |
|---|---|---|
| 2 008 945 | 11/1970 | Germany . |
| 1 931 442 | 1/1971 | Germany . |
| 57-107437 | 7/1982 | Japan . |
| 60-263728 | 12/1985 | Japan . |

*Primary Examiner*—Saúl Rodriguez
*Attorney, Agent, or Firm*—Akin, Gump, Strauss, Hauer & Feld, L.L.P.

[57] ABSTRACT

The invention relates to an indexing gear (21) for a synchronizing device (1) for a geared speed change transmission installed in motor vehicles to which a coupling body (22) as well as a friction ring (23) are allocated. In accordance with the invention, the indexing gear (21), the coupling body (22) as well as the friction ring (23) are constructed as component parts which can be prefabricated, which are joined in a rotatably fixed manner.

10 Claims, 6 Drawing Sheets

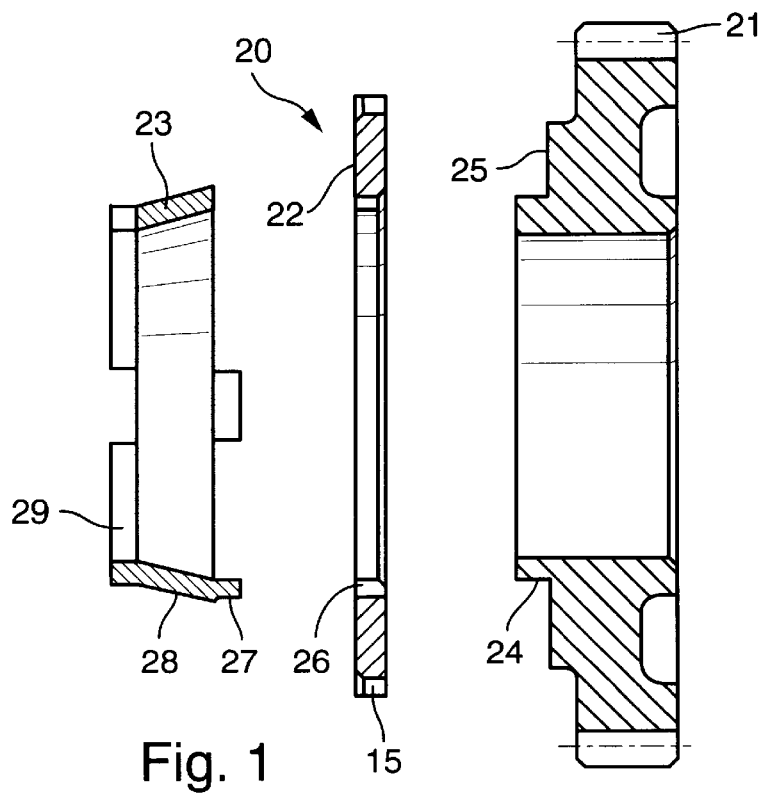
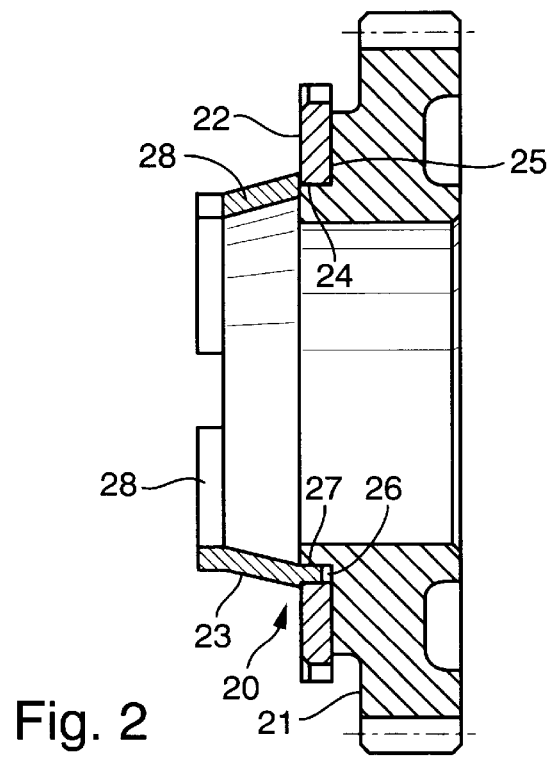
Fig. 1
Fig. 2

SYNCHRONIZING DEVICE

BACKGROUND OF THE INVENTION

The invention concerns an indexing gear for a synchronizing device of a geared speed change transmission installed in motor vehicles to which a coupling body as well as a friction ring is allocated, whereby the coupling body is connected form-locking with a sliding connector to an external gearing during a shifting process, and a conical friction area of the friction ring (23, 33) interacts with a synchronizing ring during synchronization.

Synchronizing devices of the above-mentioned type find application in transmission gears in order to simplify shifting gears of a manually shiftable gear box. A representative synchronizing device is known from DE 37 29 818 C2. This document discloses a synchronizing device on the indexing gears, which are also known as sliding gears, of which first of all an axially oriented coupling body is connected to which a friction ring is introduced. Due to their customary one-piece construction, all segments of this subassembly are made of one material. Owing to the different functions or modes of operation of individual areas of the synchronizing unit, hardening of the gearing of the indexing gear and the external gearing of the coupling element, for example, is necessary, as well as polishing the friction area of the friction ring. To limit the hardened zones, which are restricted to the gearing, a great expenditure is necessary to avoid an unwanted further hardening on all other areas of the of the indexing gear. It is the same with the grinding of the friction area of the friction ring, as the complex construction of the indexing gear prevents a rapid clamping as well as changing this component part.

An indexing gear is provided by the present invention, the construction of which assures a simplification of individual elements and reduces processing and hardening costs in comparison with the state of the art.

SUMMARY OF THE INVENTION

The previously defined object is accomplished in accordance with the invention by the features specified in the claims.

In accordance with the invention, several, in each case individually prefabricated construction units are allocated to the indexing gear or sliding gear which are joined together in a rotationally fixed manner to create a unit. This unit includes a coupling body and a friction ring in addition to the indexing gear. Here the indexing gear and the coupling body are inseparably connected with each other. The friction ring is at the same time joined and aligned in a rotationally fixed manner on the unit to ensure an inseparable connection. Between the indexing gear and the coupling body, preferably a weld or an adhesive can be inserted. The reconfiguration of the indexing gear in accordance with the invention makes possible an individual processing or heat treatment, keeping with requirements and adapted to the respective stresses of the individual construction units, owing to which exerting an influence on adjacent areas of the synchronizing unit is prevented. The gearings of the coupling body as well as of the indexing wheel are, in keeping with requirements, hardened corresponding to the respective standards, without influencing other component parts of the synchronizing unit. Constructing the component parts in accordance with invention furthermore enables a simplification, that is a manufacturing-optimized construction of the individual construction units, especially of the indexing gear, which contributes to a reduction in cost.

Other advantageous configurations of the invention are recited in the dependent claims, which are explained below.

In accordance with a preferred configuration of the invention, various manufacturing processes can be used to produce the subassemblies of the invention. For the indexing gear, this may be constructed as a cast part. Alternatively, the invention likewise includes an indexing gear constructed as a powder metal part. The disk-like constructed coupling element is by way of contrast designed in accordance with the invention as a high quality stamped metal part. For subassemblies of this design, a high quality stamping represents a cost-optimized manufacturing procedure with which at the same time the construction unit can be manufactured with an exactitude which requires no repair. A preferably non-cutting, drawing method is suited for manufacturing the sheath-like constructed friction ring. This procedure enables manufacturing a friction ring optimized as to weight associated with a sufficient inherent stability of the friction ring while at the same time meeting hardness standards.

The invention moreover includes the individual elements of the subassembly being manufactured of various materials or raw materials. A high quality casting GS 45 is preferably suited for the indexing gear, C 15; CK 15 for the coupling body and for the friction ring, 100 Cr6; 16Mn Cr5; C 80 M or even coating this material.

In one configuration of the invention, the indexing gear is provided on one side with an axially projecting rim on which the coupling body as well as the transmission element are centerable. The coupling body and friction ring are then centered on the rim and axially seated against a shoulder of the indexing gear. When using an indexing gear provided as a high quality casting with a high finish quality, a mechanical reworking of the axially projecting rim is unnecessary, which leads to a further cost reduction.

The subassembly of the invention moreover includes an integral construction in connection with which the friction ring and the coupling body are constructed in one piece preferably in the form of an L-shaped profile. An axially projecting rim on the indexing gear itself can at the same time likewise be used to accommodate this one piece construction.

The invention likewise includes an assembly whose disk-like coupling body is centered over an internal diameter on the rim of the indexing wheel, and the conically shaped friction ring is joined form-locking with the coupling body. For this, the friction ring has axially projecting pegs on the side with the largest diameter area which engage form-locking into corresponding recesses of the coupling body. To create a rotation-fixed connection, stamping over the pegs in the area of the recesses on the coupling body presents itself, whereby a certain degree of freedom remains for the friction ring for tolerance-conditioned alignment with the construction units which stand in operative connection with the friction ring.

For realizing a durable securing of the individual construction units of the subassembly, these are joined form-locking and inseparably with one another. In addition to welding and soldering, gluing can likewise be used. Furthermore, individual construction units can be permanently secured by a press fitting.

In a further advantageous configuration of the invention, the subassembly of the invention is further provided with a synchronizing ring. This way a simple synchronization is realizable in connection with which a synchronizing ring is guided on the friction ring or the friction ring encloses the synchronizing ring. The subassembly supplemented with the synchronizing ring represents a preassembled unit which, for example, includes all assemblies of a manufacturer which are delivered to a vehicle manufacturer as supplier element. The construction of the subassembly here enables an exchange from a simple to a multiple synchronization. This way, the invention makes possible the use of a basic subassembly which, depending upon the synchronous output requirement, can be equipped with a varying number of synchronizing rings without altering the construction.

To produce a twofold synchronization, two synchronizing rings, which are arranged on both sides of the friction ring, can be allocated to the subassembly of the invention.

The invention moreover includes a subassembly which is designed to provide a threefold synchronization. For this, the indexing gear is provided with an axially projecting inner cone which is arranged at a distance from the friction ring. A first synchronizing ring is installed in the compartment radially defined between the friction ring and the inner cone which is run on the friction areas of the inner cone and the friction ring. The exterior of the friction ring forms a third friction area on which a second synchronizing ring is conveyed. As an alternative to an internal cone joined in one piece with the indexing gear, an internal ring can be inserted form-locking on the indexing gear can also be provided in accordance with the invention. For this, an inner cone which is provided with parallel protruding pegs which engage in appropriate recesses especially offers itself.

The invention is represented in embodiments which are discussed in more detail below.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1, a subassembly of the invention whose three individual elements are represented at a distance to one another;

FIG. 2, a completed subassembly consisting of the three component parts depicted in FIG. 2;

DETAILED DESCRIPTION OF THE INVENTION

Figure 3:
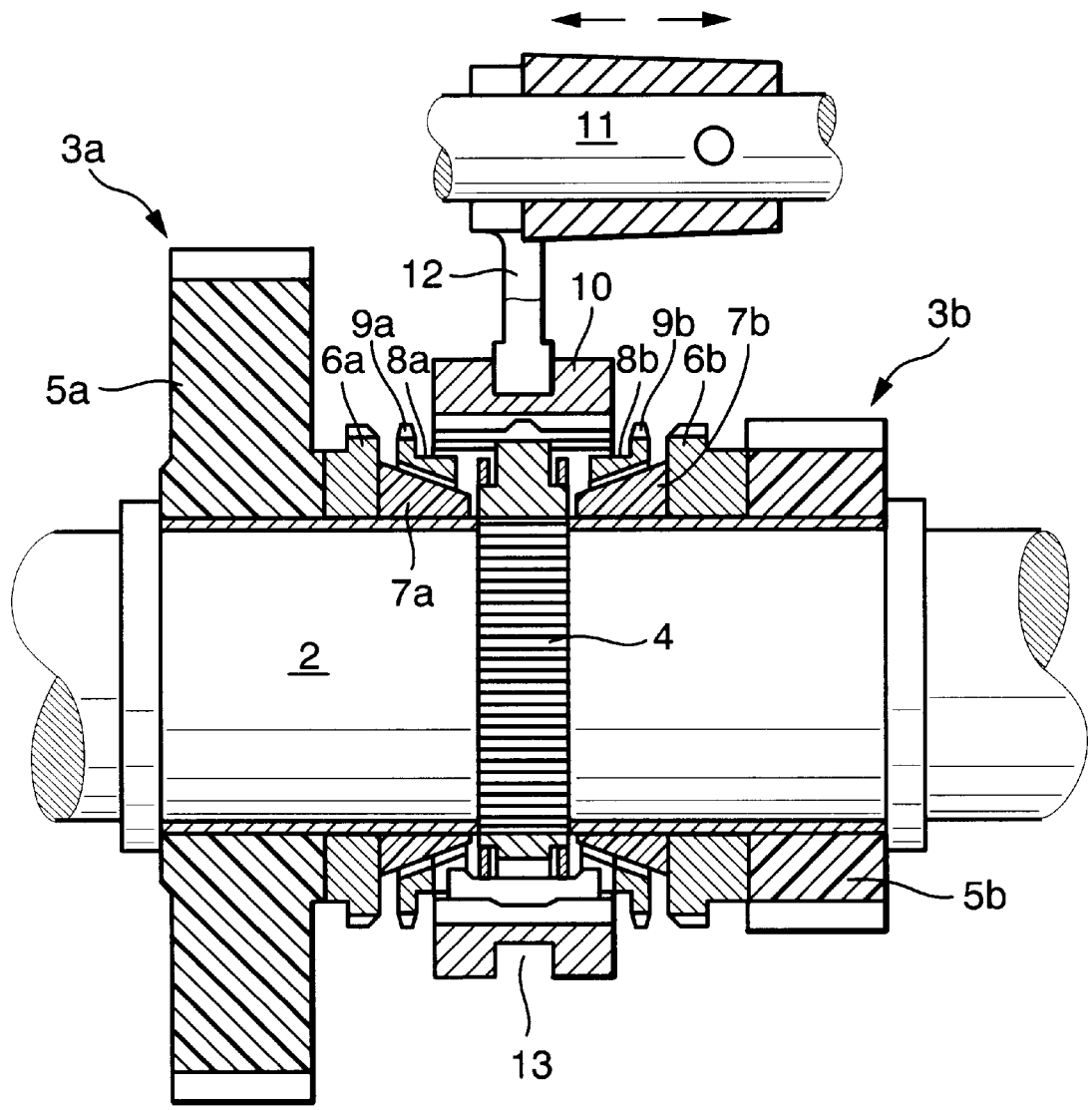
FIG. 3, the structur of a synchronizing device which has indexing wheels of the previous design.

Certain terminology is used in the description for convenience only and is not limiting. The word "right," "left," "lower" and "upper" designate directions in the drawings to which reference is made. The words "inwardly" and "outwardly" refer to directions toward and away from, respectively, the geometric center of the synchronizing device and designated parts thereof. The terminology includes the words specifically mentioned above, derivatives thereof and words of similar import.

A first embodiment of a subassembly 20 of the invention is shown in FIG. 1 in which all component parts are represented apart. The subassembly 20 includes an indexing gear 21, a coupling body 22 as well as a friction ring 23. This multipart construction of the subassembly 20 makes a selection of materials possible which is adapted to the respective needs or standards of the individual parts. At the same time, divergent procedures for manufacturing these component parts can be used owing to the different geometrical configurations of the individually constructed parts.

The completed subassembly 20 is depicted in FIG. 2, and include the indexing gear 21, the coupling body 22 and the friction ring 23, which has a conical friction area 28. For form-locking assembly of these parts, the indexing gear 21 is provided with an axially projecting rim 24 as well as with a shoulder 25 on which the coupling body 22 is centered, and experiences an axial limit as it seats against the shoulder. In the area of an internal diameter of the coupling body 22, several notches 26 are provided which are distributed on the periphery into which the axially projecting pegs 27 of the friction ring 23 are inserted, whereby the pegs 27 are at the same time centered on the rim 24 of the indexing gear. To ensure an inseparable connection of all construction parts of the subassembly 20, these parts are preferably welded in the area of the rim 24. The friction ring 23 is furthermore provided with torsion protection 29 which is arranged running axially on a face turned away from the pegs 27.

The structure of a synchronizing device 1 can be understood from FIG. 3, which is illustrated in a longitudinal section. The structure includes two subassemblies 3a, 3b of the previous one part design which are arranged apart on a gear shaft 2 rotatable by a gear 4. Each subassembly 3a, 3b is provided with an indexing gear 5a, 5b having an external gearing. Pointing in the direction of the gear 4, a coupling body 6a, 6b is in each case placed in front of the indexing gear 5a, 5b to which a friction ring 7a, 7b is connected. To distinguish the individual elements of the subassembly 3a, 3b, these are crosshatched differently. A synchronizing ring 9a, 9b is in each case conveyed on a conically running friction area 8a, 8b of the friction ring 7a, 7b whose unilaterally bent section has a top gearing outside, which interacts with an axially movable sliding connector 10. The sliding connector 10 is shaped like a ring element and includes the coupling support 4, and is joined with this by a gearing. The gearing profile of the sliding connector 10 is complementary to the top gearings of the synchronizing rings 9a, 9b as well as of the coupling bodies 6a, 6b. An axial displacement of the sliding connector 10 in the direction of a synchronizing unit 3a, 3b up to a radial coverage of a coupling body 6a, 6b, in connection with which this is joined with the sliding connector 10 form-locking by the gearing, makes possible a transmission of force from the gear shaft 2 to an indexing gear 5a, 5b, which in each case stands in engagement with a gear not further depicted in FIG. 1. A shift finger 12 which engages form-locking in a recess 13 of the sliding connector serves to move the sliding connector. The shift finger 12 is positionally stabilized on a control shaft 11 arranged parallel to the gear shaft 2 and for example, is movable in one of the axial directions indicated by arrows by a control lever which can be activated manually.

A one part subassembly 3a, 3b in accordance with FIG. 3 would require a high cost manufacturing outlay, especially for hardening the gearing 14 of the indexing gear 5b and the top gearing 15 of the coupling body 6b. An increased expenditure is likewise required for polishing the friction area 8b in connection with a subassembly 3b, if it is constructed as one part owing to a more expensive clamping.

Figure 4:
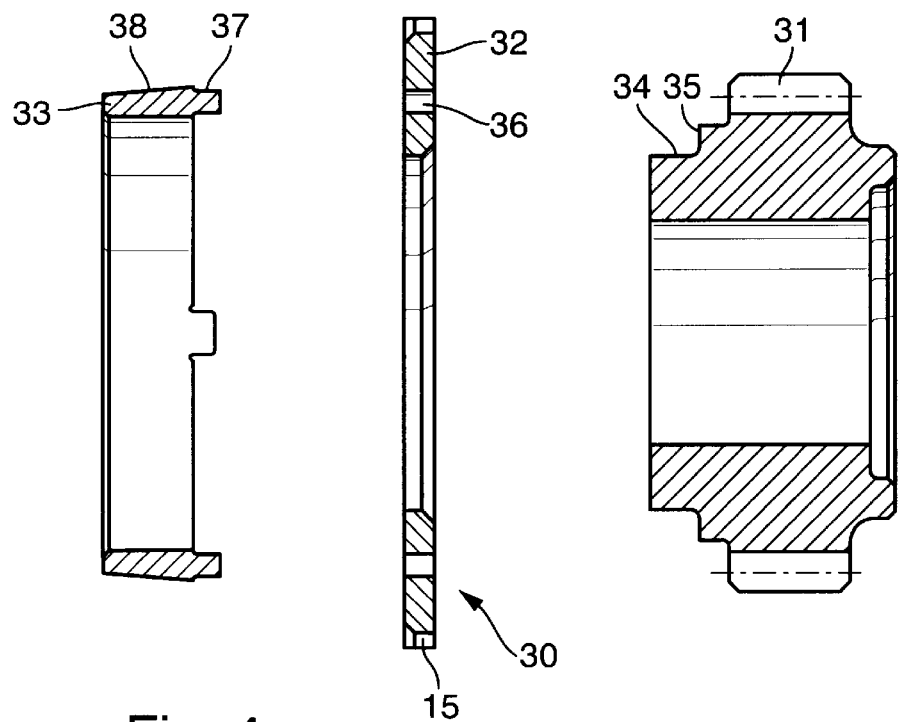
FIG. 4, a further construction of a subassembly of the invention the parts of which are represented apart.
Figure 5:
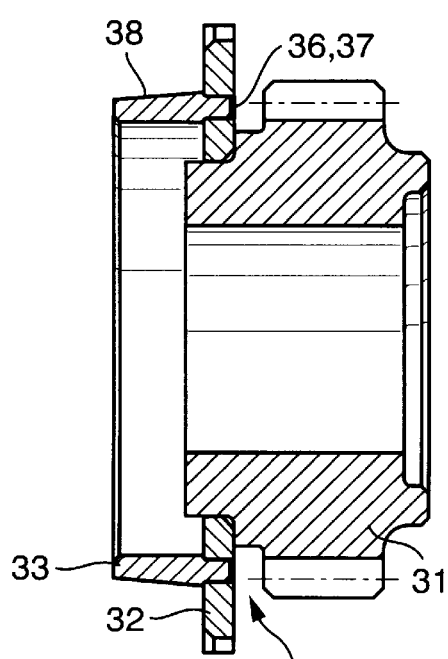
FIG. 5, a subassembly consisting of the component parts in accordance with FIG. 4 in longitudinal section.

The structure of a second subassembly 30 in accordance with the present invention is shown in FIGS. 4 and 5. The subassembly 30 likewise has three component parts, the indexing gear 31, the coupling body 32 as well as the friction ring 33. A difference from subassembly 20 (see FIG. 1 and 2), is that the friction ring 33 is held form-locking and positionally stabilized in the coupling body 32. For this, the friction ring 33 is provided with pegs 37 which extend axially end to end and engage form-locking in notches 36 arranged radially displaced from the internal diameter of the coupling body 32. To form an inseparable junction between the friction ring 33 provided with a friction area 38 and the coupling body 32, pegs 37, for example, are stamped over on the notches 36. As an alternative, or in addition, a welding of these construction parts can be provided. The coupling body 32 is positionally stabilized on the rim 34 of the indexing gear 33 and experiences an axial limit on the shoulder 35. The completed synchronizing unit 30 assembled from the component parts is illustrated in FIG. 5.

Figure 6:
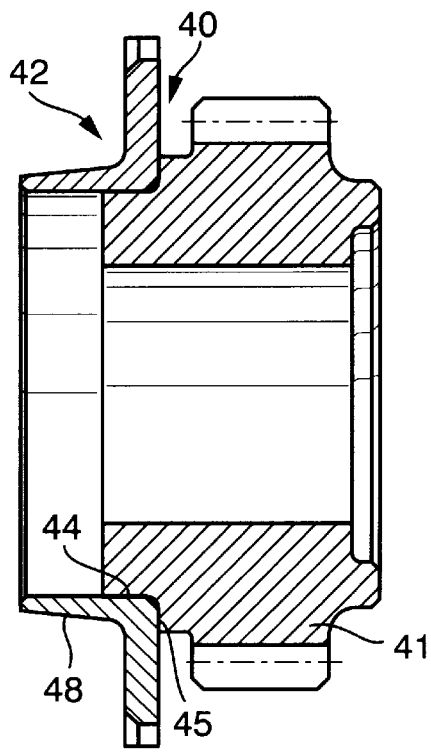
FIG. 6, a subassembly consisting of two component parts.

FIG. 6 shows a further variant of the subassembly of the invention. The subassembly 40 includes two construction parts, the indexing gear 41 as well as a transmission element 42, which assumes the function of the coupling body as well as that of the friction ring. The transmission element 42, which has an L-shaped profile in longitudinal section and a conical friction area 48, is centered on the rim 44 of the indexing gear 41 and experiences an axial limit on the shoulder 45.

Figure 7:
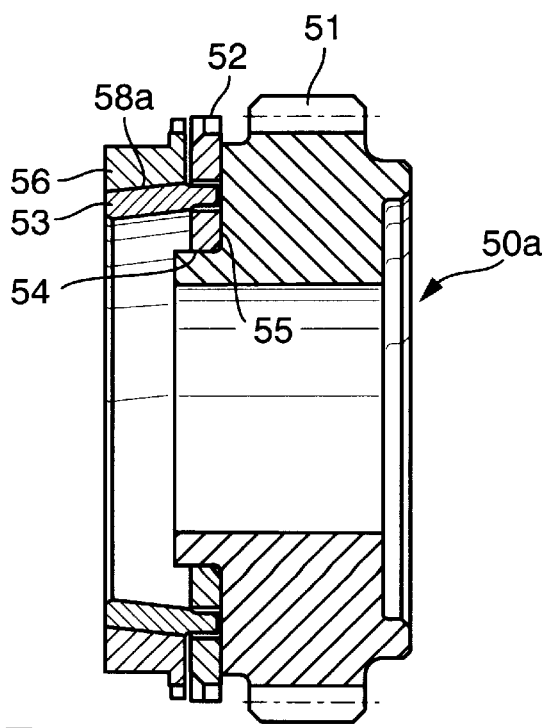
FIG. 7, a subassembly which is provided with a synchronizing ring passed on the friction ring for producing a simple synchronization.

FIG. 7 illustrates a subassembly 50a which is comprised of an indexing gear 51, a coupling body 52 and a friction ring 53. In accordance with FIG. 1, the coupling body 52 is centered here on the rim 54 and braced on the shoulder 55 of the indexing gear 51. To produce a simple synchronization, a synchronizing ring 56 is arranged on the friction area 58a of the friction ring 53.

Figure 8:
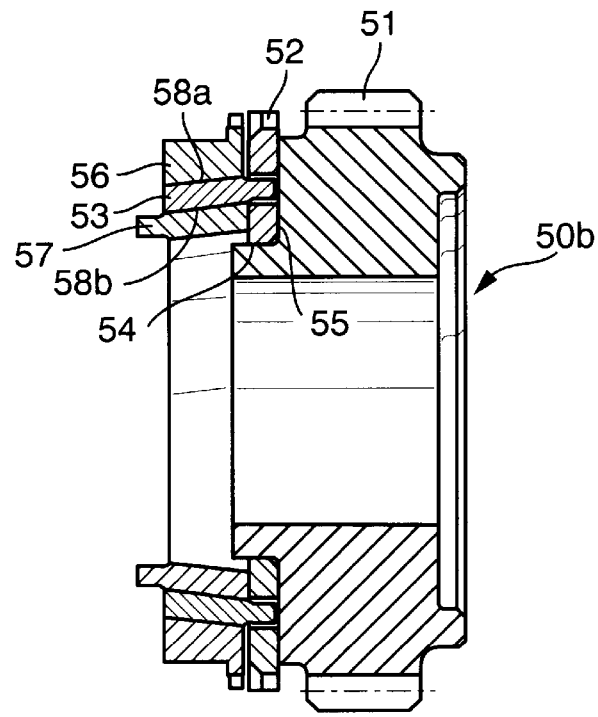
FIG. 8, the combination of an indexing wheel of the invention with synchronizing rings passed on both sides of the friction ring.

FIG. 8 illustrates a subassembly 50b which corresponds to the structure of subassembly 50a represented in FIG. 7. To produce a twofold synchronization, synchronizing rings are arranged on both sides of the friction ring 53. The synchronizing ring 56 encloses friction ring 53 and stands in connection with this over friction area 58a. On the inside, synchronizing ring 57 is braced on friction area 58b.

Figure 9:
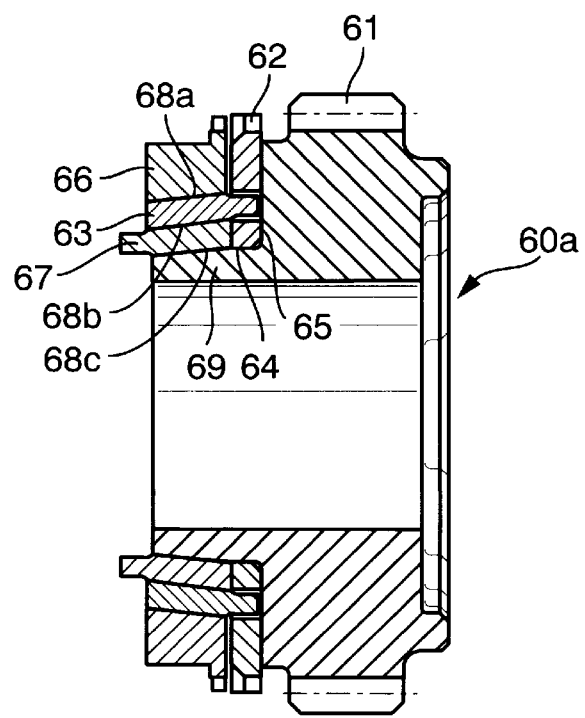
FIG. 9, a threefold synchronization in connection with which the indexing wheel is provided with an axially projecting inner cone in one piece on which a first synchronous ring is run, and a second synchronous ring is arranged on the friction ring.

FIG. 9 depicts a threefold synchronization in association with a subassembly 60a. The coupling body 62 is centered on the rim 64 of the indexing wheel 61 and braced on the shoulder 65. The friction ring 63 is held form-locking in the coupling body 62 by pegs. The indexing gear 61 is provided in one piece with an axially projecting inner cone 69 which is arranged radially apart from the friction ring 63. In a compartment radially bounded by the friction ring 63 and the inner cone 69, a first synchronizing ring 67 is installed which is arranged over friction areas 68b and 68c on the friction ring 63 or on the inner cone 69. The second synchronizing ring 66 is guided outside the friction ring 63 on friction area 68a.

Figure 10:
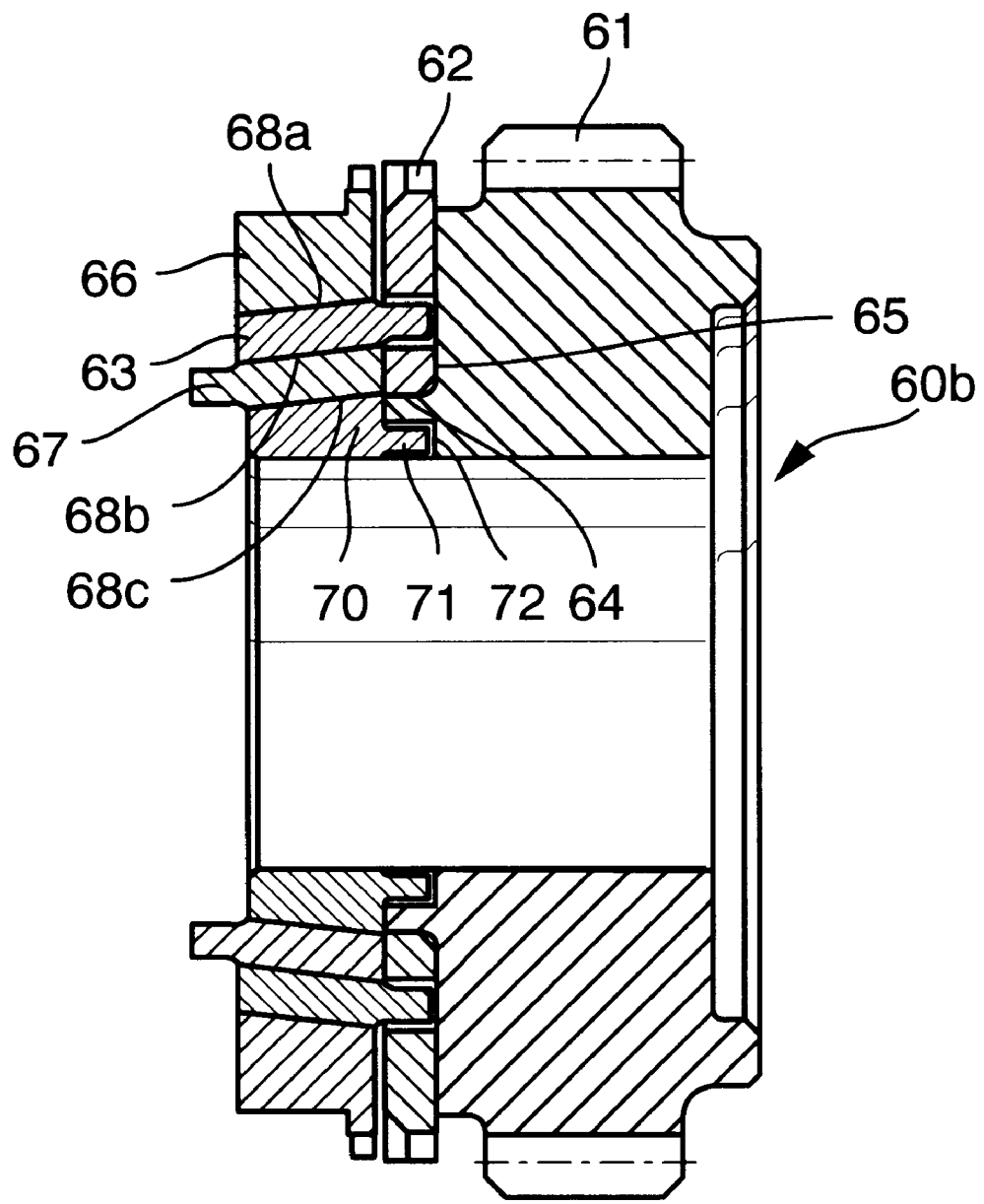
FIG. 10, a threefold synchronization corresponding to FIG. 9 to the greatest extent, with which, as distinct from FIG. 9, the inner cone is installed insertable in the indexing wheel.

The subassembly 60b illustrated in FIG. 10 differs from subassembly 60a in FIG. 9 by a separately constructed inner cone 70. This is held form-locking through axially projecting pegs 71 arranged peripherally distributed in recesses 72 of the indexing gear.

It will be appreciated by those skilled in the art that changes can be made to the embodiments described above without departing from the broad inventive concept. It is understood, therefore, that this invention is not limited to the particular embodiments disclosed, but it is intended to cover modifications within the spirit and scope of the present invention.

We claim:

1. An indexing gear assembly (20, 30, 50a, 50b, 60a, 60b) for a synchronizing device for a geared speed change transmission installed in motor vehicles, comprising an indexing gear (21, 31, 41, 51, 61), a coupling body (22, 32, 52, 62) and a friction ring (23, 33, 53, 63), the coupling body (22, 32, 52, 62) having external gearing which is adapted to be joined form-locking with a sliding connector during a shifting operation, the friction ring (23, 33, 53, 63) includes a conical friction area (28, 38, 58a, 58b, 68a, 68b, 68c) which is adapted to interact with a synchronizing ring during synchronization, the indexing gear (21, 31, 51, 61), the coupling body (22, 32, 53, 63) and the friction ring (23, 33, 53, 63) being constructed as component parts which are prefabricated and are joined in a rotatably fixed manner with each other to create the indexing gear subassembly (20, 30, 50a, 50b, 60a, 60b).

2. The indexing gear assembly according to claim 1, wherein the indexing wheel (21, 31, 41, 51, 61) includes an axially projecting rim (24, 34, 44, 54, 64) on one side which is connected with a radially extending shoulder (25, 35, 45, 55, 65) for centering the coupling body (22, 32, 52, 62) and providing an axial stop.

3. The indexing gear subassembly according to claim 1, wherein the conical friction ring (33) is conically shaped and is provided with axially projecting pegs (37) on a largest diameter face of the conical friction ring which engage form-locking in corresponding notches (36) of the coupling body (32).

4. The indexing gear subassembly according to claim 1, wherein the coupling body (22, 32, 52, 62) and the friction ring (23, 33, 53, 63) are inseparably fastened to the indexing gear (21, 31, 41, 51, 61).

5. The indexing gear subassembly according to claim 1, wherein the subassembly (50a) for producing a simple synchronization includes one synchronizing ring (56) located on the friction ring (53).

6. The indexing gear subassembly according to claim 1, wherein the subassembly (50b) is designed for twofold synchronization, and a synchronizing ring (56, 57) is located on each side of the friction ring (53).

7. The indexing gear subassembly according to claim 1, wherein the indexing gear is provided in one piece with an axially projecting inner cone (69) whose axial length corresponds to that of the friction ring (63), and for forming a threefold synchronization, a synchronizing ring (67) is arranged between the inner cone (69) and the friction ring (63), and a second synchronizing ring (66) is arranged on the friction ring (63).

8. The indexing gear subassembly according to claim 7, wherein the inner cone (70) is held form-locking to the indexing gear (61) by axially projecting pegs (71).

9. An indexing gear assembly (20, 30, 50a, 50b, 60a, 60b) for a synchronizing device for a geared speed change transmission installed in motor vehicles, comprising an indexing gear (21, 31, 41, 51, 61), a coupling body (22, 32, 52, 62) and a friction ring (23, 33, 53, 63), the coupling body (22, 32, 52, 62) having external gearing which is adapted to be joined form-locking with a sliding connector during a shifting operation, the friction ring (23, 33, 53, 63) includes a conical friction area (28, 38, 58*a*, 58*b*, 68*a*, 68*b*, 68*c*) which is adapted to interact with a synchronizing ring during synchronization, the indexing gear (21, 31, 51, 61), the coupling body (22, 32, 53, 63) and the friction ring (23, 33, 53, 63) being constructed as component parts which are prefabricated and are joined in a rotatably fixed manner with each other to create the indexing gear subassembly (20, 30, 50*a*, 50*b*, 60*a*, 60*b*), wherein the indexing gear (21, 31, 41, 51, 61) is constructed as a casting, the coupling body (22, 32, 52, 62) is constructed as a high quality stamped metal part and the friction ring (23, 33, 53, 63) is manufactured in a drawing process without cutting.

10. An indexing gear assembly (20, 30, 50*a*, 50*b*, 60*a*, 60*b*) for a synchronizing device for a geared speed change transmission installed in motor vehicles, comprising an indexing gear (21, 31, 41, 51, 61), a coupling body (22, 32, 52, 62) and a friction ring (23, 33, 53, 63), the coupling body (22, 32, 52, 62) having external gearing which is adapted to be joined form-locking with a sliding connector during a shifting operation, the friction ring (23, 33, 53, 63) includes a conical friction area (28, 38, 58*a*, 58*b*, 68*a*, 68*b*, 68*c*) which is adapted to interact with a synchronizing ring during synchronization, the indexing gear (21, 31, 51, 61), the coupling body (22, 32, 53, 63) and the friction ring (23, 33, 53, 63) being constructed as component parts which are prefabricated and are joined in a rotatably fixed manner with each other to create the indexing gear subassembly (20, 30, 50*a*, 50*b*, 60*a*, 60*b*), wherein the component parts of the subassembly (20, 30, 40, 50*a*, 50*b*, 60*a*, 60*b*) are manufactured of different materials, the indexing wheel (21, 31, 41, 51, 61) being made of high quality casting GS 45, the clutch (22, 32) being made of one of C 15 and CK 15; and the friction ring being made of one of 100 Cr 6; 16 Mn Cr 5 and C 80 M.

\* \* \* \* \*